US007945564B2

(12) United States Patent
Amir et al.

(10) Patent No.: US 7,945,564 B2
(45) Date of Patent: *May 17, 2011

(54) SYNTHESIZING INFORMATION-BEARING CONTENT FROM MULTIPLE CHANNELS (75) Inventors: Amon Amir, Cupertino, CA (US); Gal Ashour, Yokneam (IL); Brian K. Blanchard, Sunnyvale, CA (US); Matthew Denesuk, San Jose, CA (US); Reiner Kraft, Gilroy, CA (US)

(73) Assignee: International Business Machines Corporation, Armonk, NY (US)

(*) Notice: Subject to any disclaimer, the term of this patent is extended or adjusted under 35 U.S.C. 154(b) by 449 days.

This patent is subject to a terminal disclaimer.

(21) Appl. No.: 12/191,727

(22) Filed: Aug. 14, 2008

(65) Prior Publication Data
US 2009/0019045 A1    Jan. 15, 2009

Related U.S. Application Data (63) Continuation of application No. 10/044,720, filed on Jan. 11, 2002, now Pat. No. 7,117,200, which is a continuation of application No. 11/523,104, filed on Sep. 19, 2006, now Pat. No. 7,512,598.

(51) Int. Cl.
*G06F 17/30* (2006.01)
(52) U.S. Cl. .................. 707/722; 707/739
(58) Field of Classification Search .......... 707/707, 707/722, 739
See application file for complete search history.

(56) References Cited

U.S. PATENT DOCUMENTS

| | | | | |
|---|---|---|---|---|
| 4,358,824 A * | 11/1982 | Glickman et al. | ............... | 1/1 |
| 5,077,668 A * | 12/1991 | Doi | ............... | 715/206 |
| 5,276,869 A * | 1/1994 | Forrest et al. | ............... | 709/206 |
| 5,687,131 A * | 11/1997 | Spaderna | ............... | 365/230.01 |
| 5,689,716 A * | 11/1997 | Chen | ............... | 715/256 |
| 5,806,021 A * | 9/1998 | Chen et al. | ............... | 704/9 |
| 5,918,240 A * | 6/1999 | Kupiec et al. | ............... | 715/243 |
| 5,924,108 A * | 7/1999 | Fein et al. | ............... | 715/267 |
| 6,052,657 A * | 4/2000 | Yamron et al. | ............... | 704/9 |

(Continued)

FOREIGN PATENT DOCUMENTS
JP    11168383    12/1997

(Continued)

OTHER PUBLICATIONS (Abstract) Borriello, G. "High-level VLSI Synthesis", Kluwer Academic Publications, 1991, pp. 153-176.

(Continued)

*Primary Examiner* — John R. Cottingham
*Assistant Examiner* — Alexandria Y Bromell
(74) *Attorney, Agent, or Firm* — Jeffrey N. Giunta; Fleit Gibbons Gutman Bongini & Bianco PL (57) ABSTRACT

A computing system and method receive a query; separate a plurality of information sources into individual elements of content (EOC); tag each EOC with metadata that indicate source, date, and other relevant information; pattern match each EOC; calculate the respective distance function from every EOC to every other EOC; and output EOC to a set of virtual buffers (404) containing appropriately related EOC less than a given distance value. The method further creates virtual summary buffers (406); then concatenates the EOC in each virtual buffer (404); applies a comparative analysis filter (318) to remove redundant sub-elements; and presents the results as summary digests (408).

7 Claims, 7 Drawing Sheets

U.S. PATENT DOCUMENTS

| | | | |
|---|---|---|---|
| 6,240,444 B1 | 5/2001 | Fin et al. | |
| 7,035,868 B2 * | 4/2006 | Hashimoto et al. | 707/705 |
| 2002/0138524 A1 * | 9/2002 | Ingle et al. | 707/530 |
| 2003/0060923 A1 * | 3/2003 | Scotese | 700/217 |
| 2003/1005092 | 3/2003 | Chang of al. | 707/3 |
| 2003/0187726 A1 * | 10/2003 | Bull et al. | 705/14 |

FOREIGN PATENT DOCUMENTS

| | | |
|---|---|---|
| JP | 11308593 | 4/1998 |
| WO | WO 97/37314 | 10/1997 |

OTHER PUBLICATIONS (Abstract) Fagin, R. "Combining Fuzzy Information from Multiple Systems", Journal of Computer and System Sciences, vol. 58, No. 1, Feb. 1999, pp. 83-99.

U.S. Appl. No. 60/081,852, filed Apr. 15, 1998.

U.S. Appl. No. 09/288,580, filed Apr. 8, 1999.

* cited by examiner

SYNTHESIZING INFORMATION-BEARING CONTENT FROM MULTIPLE CHANNELS

CROSS REFERENCE TO RELATED APPLICATION

This is a continuation of application Ser. No. 10/044,720 filed Jan. 11, 2002, now U.S. Pat. No. 7,117,200 and application Ser. No. 11/523,104, filed Sep. 19, 2006, now U.S. Pat. No. 7,512,598. The entire content and disclosure of application Ser. Nos. 10/044,720 and 11/523,104 are herein incorporated by reference.

BACKGROUND OF THE INVENTION

1. Field of the Invention

This invention generally relates to the field of computer based search systems, and more particularly relates to a system and method for synthesizing information-bearing content from multiple channels.

2. Description of Related Art

The explosive growth of content available on the World-Wide-Web has led to an increased demand and opportunity for a means of collaborating information. People are increasingly finding it difficult to sort through the great mass of content available with apparent relevance to even a narrowly defined need. They are overwhelmed with information and greatly desire appropriate tools or services that can aggregate relevant content and produce appropriate distillations or summarizations. Further, the ease with which content can be made available on the Internet, along with the greater speed with which "raw" content is generally made available, has created a greater-than-ever need for efficient means of judging the correctness of information. Strictly human-based editorial judgment is becoming no longer viable or desirable.

A typical search engine possesses a user interface with a search window where the user enters an alphanumeric search expression or keywords. The search engine sifts through a database of information for the user's search terms, and returns the search results in the form of HTML pages. Each search result includes a list of individual entries that have been identified by the search engine as satisfying the user's search expression. Each entry or "hit" includes a hyperlink that points to a location within the database. In addition to the hyperlink, certain search engine result pages include a summary or abstract that describes the content of the document. Other information may also be returned as part of a search result in response to a user's request.

Although search engines have made tremendous strides at improvement in recent years, the tremendous volume of the content simply makes the search engine cumbersome to use. The user is forced to manually sort through a long list of results to try and determine what is most important to him. Additionally, many of the results returned contain the same information, making it even more difficult to find the true article of interest.

Therefore a need exists to overcome the problems with the prior art as discussed above, and particularly for a method of synthesizing the information-bearing content from multiple channels into condensed digests in order to maximize efficiency of a search.

SUMMARY OF THE INVENTION

According to a preferred embodiment of the present invention, a computing system and method receives a query, separates a plurality of information sources into individual elements of content (EOC) and calculates a respective distance function from every EOC to every other EOC for each combination of two EOC. The system and method further pre-define each buffer within a plurality of virtual buffers to contain EOC that all have respective distance functions between each other of less than a given distance value. At least one buffer within the plurality of buffers is pre-defined based upon the query. The system and method further provide each of the EOC to a respective associated virtual buffer within the plurality of virtual buffers based upon the respective distance functions between the each of the EOC and EOC previously provided to that respective associated virtual buffer. The system and method also provide the contents of at least one selected virtual buffer.

DESCRIPTION OF THE PREFERRED EMBODIMENTS

The present invention, according to a preferred embodiment, overcomes problems with the prior art by leveraging the growing capabilities of computational power and available bandwidth to automate both the functions of content aggregation/summarization and editorial judgment. A preferred embodiment further leverages technology related to automated video indexing and content extraction (e.g., via speech-to-text or phoneme recognition) to allow for one to manipulate, evaluate, and judge video-based content.

According to a preferred embodiment, several content channels are summarized into domain-independent digests. The central concept relates to analyzing mutually similar elements of content (EOC) to generate "digests," or new EOC which reflect the degree of corroboration (DOC) or other comparative measure between the original EOC. The original EOC and the derived digests may comprise at least one of text, video, audio, video speech signals, and digital media. Digital media generally includes all forms of content that are represented in computer readable form, and including content in digital format.

As an example, suppose an earthquake is reported in the news. Numerous articles would be found in multiple sources, and most of the important information will be somewhat similar in all the sources. Instead of showing numerous "hits" for the same basic premise, the details would be summarized into several condensed digests containing different topics relevant to the earthquake, e.g. the financial impact of the earthquake. The user would have a much easier time finding relevant information in the digests.

Figure 1:
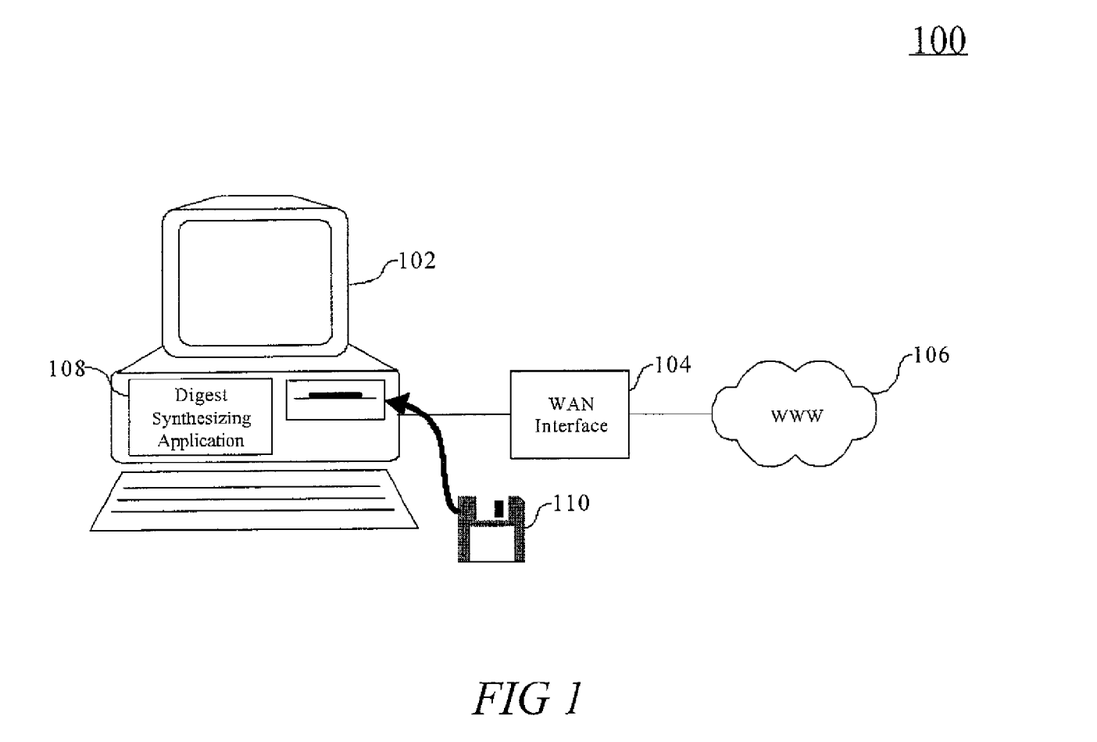
FIG. 1 is a block diagram illustrating a digest synthesizing system in accordance with a preferred embodiment of the present invention.
Figure 2:
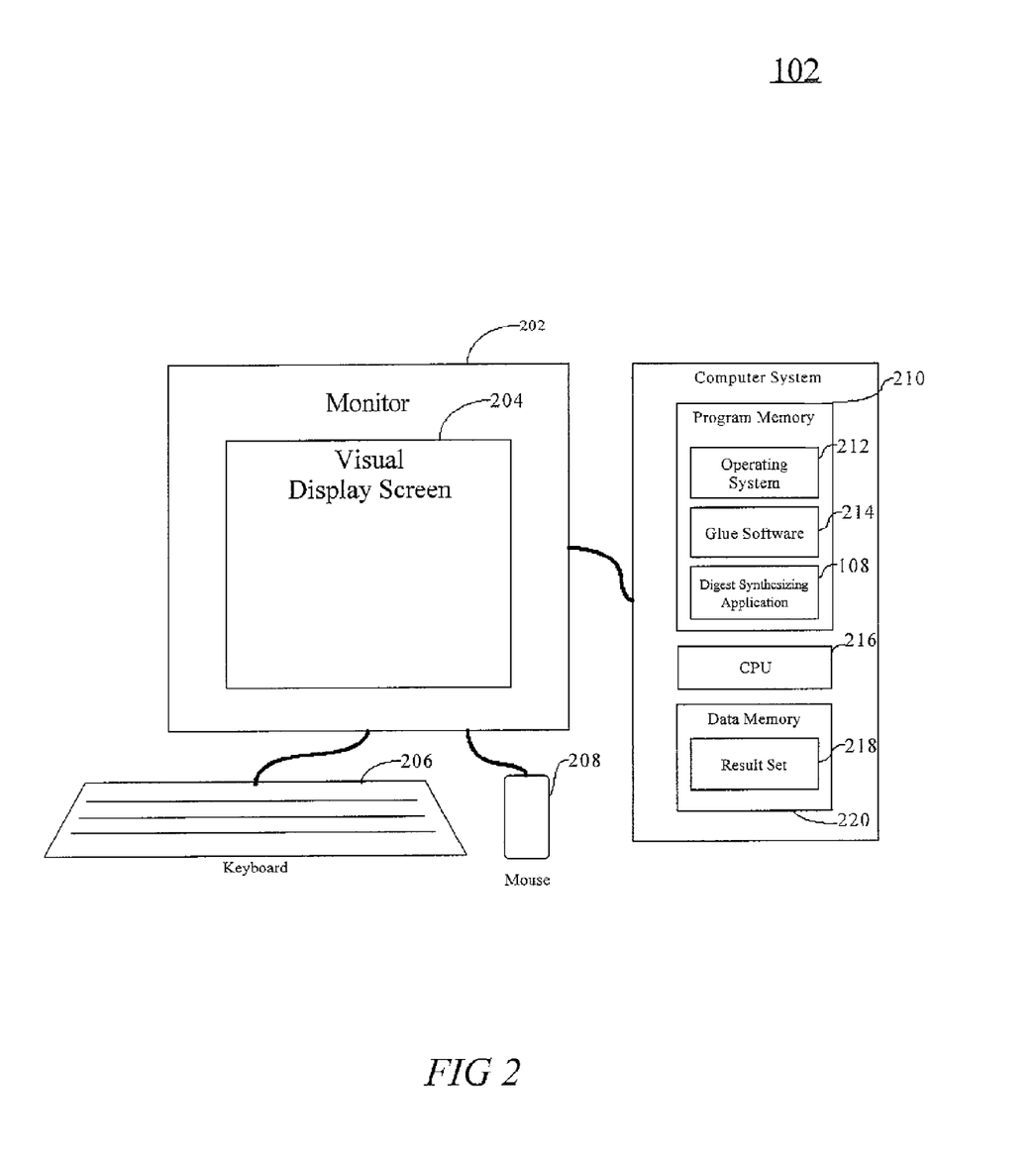
FIG. 2 is a more detailed block diagram showing a computer system in the system of FIG. 1, according to a preferred embodiment of the present invention.

FIGS. 1 and 2 illustrate an exemplary digest synthesizing system according to a preferred embodiment of the present invention. The digest synthesizing system 100 includes a computer system 102, having a digest synthesizing application 108. Computer system 102 may be communicatively coupled with the world-wide-web 106, via a wide area network interface 104. The wide area network interface 104 may be a wired communication link or a wireless communication link. Additionally, computer system 102 may also be communicatively coupled with a local area network (not shown) via a wired, wireless, or combination of wired and wireless local area network communication links (not shown).

Each computer system 102 may include, inter alia, one or more computers and at least a computer readable medium 110. The computers preferably include means for reading and/or writing to the computer readable medium 110. The computer readable medium 110 allows a computer system to read data, instructions, messages or message packets, and other computer readable information from the computer readable medium. The computer readable storage medium 110, for example, may include non-volatile memory, such as Floppy, ROM, Flash memory, Disk drive memory, CD-ROM, and other permanent storage. It is useful, for example, for transporting information, such as data and computer instructions, between computer systems.

The computer system 102, according to the present example, includes a controller/processor 216 (shown in FIG. 2), which processes instructions, performs calculations, and manages the flow of information through the computer system 102. Additionally, the controller/processor 216 is communicatively coupled with program memory 210. Included within program memory 210 are a digest synthesizing application 108 (which will be discussed in later in greater detail), operating system platform 212, and glue software 214. The operating system platform 212 manages resources, such as the data stored in data memory 220, the scheduling of tasks, and processes the operation of the digest synthesizing application 108 in the program memory 210. The operating system platform 212 also manages a graphical display interface (not shown), a user input interface (not shown) that receives inputs from the keyboard 206 and the mouse 208, and communication network interfaces (not shown) for communicating with the network link 104. Additionally, the operating system platform 212 also manages many other basic tasks of the computer system 102 in a manner well known to those of ordinary skill in the art.

Glue software 214 may include drivers, stacks, and low level application programming interfaces (API's) and provides basic functional components for use by the operating system platform 212 and by compatible applications that run on the operating system platform 212 for managing communications with resources and processes in the computing system 102.

Figure 3:
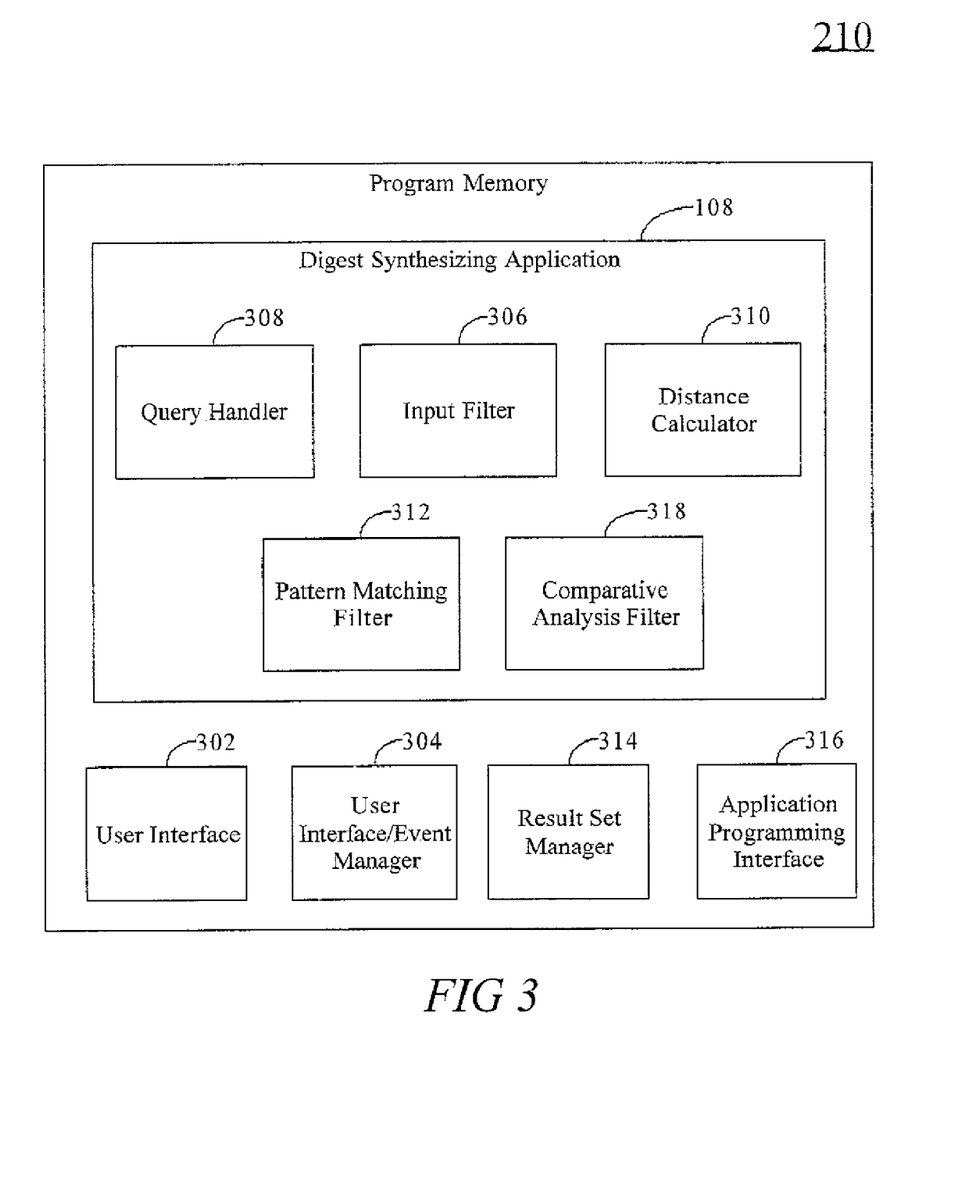
FIG. 3 is a more detailed block diagram showing a program memory in the system of FIG. 1, according to a preferred embodiment of the present invention.
Figure 4:
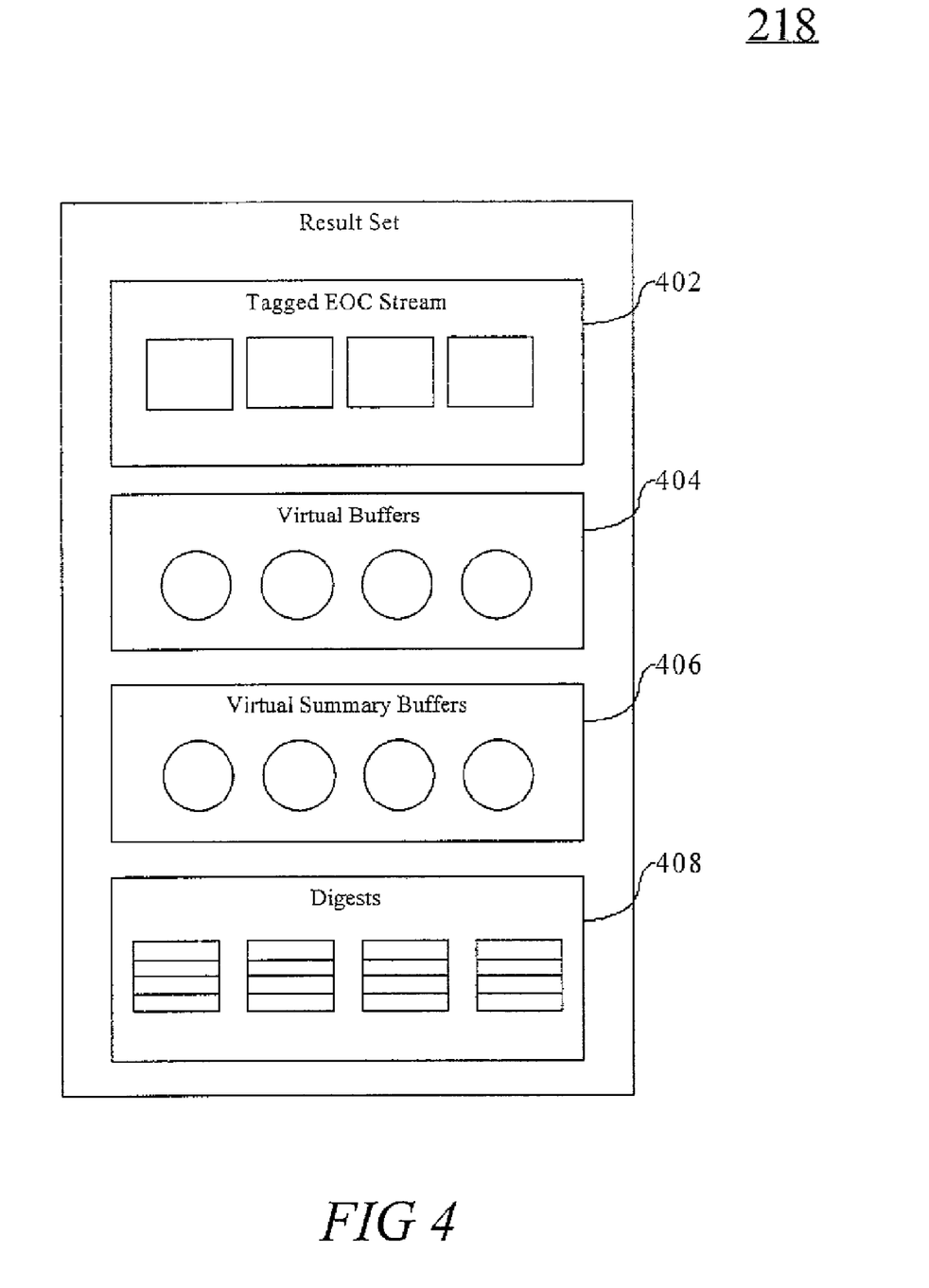
FIG. 4 is a more detailed block diagram of a result set in the system of FIG. 2, according to a preferred embodiment of the present invention.

FIGS. 3 and 4 illustrate an exemplary program memory 210 and the structure of the result set 218 according to a preferred embodiment of the present invention. The user interface/event manager 304 is structured to receive all user interface/event manager 304 events, such as mouse movements, keyboard inputs, drag and drop actions, user selections, and updates to the display 204. User interface/event manager 304 is also structured to receive match digests, from the result set manager 316, which will be discussed subsequently, representing the result set 218. These results are then displayed to the user via the display 204. Alternatively, the results could be sent to a user automatically via email or instant messaging.

After the user has requested a keyword search, the query handler 308 is invoked from the user interface/event manager 304 to initiate the user's search request. Alternatively, input to the query handler could be provided via a browsing mode of an Internet browser or any other user interface dialog form or application, or an agent that pushes relevant summarized information to a user based on a user profile. Input to the query handler 304 can preferably be a text based search query.

The query handler 304 then invokes the digest synthesizing application 108 to use the preferably text based search query as an input filter 306 for a plurality of information sources. The system performs a search for relevant sources related to the query. Any method for web search (such as those used by current and future search engines) can be used for this matter. The plurality of information sources could be a plurality of content channels, or, additionally, a plurality of related stories delivered on a single channel at different periods of time. The output of the input filter 306 is a stream of tagged EOC elements 402. A pattern-matching filter 312 performs a pattern matching or similar function on the EOC data stream 402 and provides EOC to a set of virtual buffers 404 where each virtual buffer contains a set of appropriately related EOC. A distance calculator 310 computes a set of "distances" from every EOC to every other EOC. Each of the virtual buffers 404 is then made to contain an EOC and every EOC that is less than a certain "distance" from it.

Optionally, virtual buffers 404 may be followed by processing to create virtual summary buffers 406, which serve to create summaries or perform other advantageous preprocessing which supports the comparative analysis filter 318.

The content of each virtual buffer 404 or virtual summary buffer 406 is passed through a comparative analysis filter 318, which analyzes the "mutually close" EOC, and, based on a set of heuristics including natural language processing algorithms, rule based algorithms, and other decision criteria, provides a set of digests 408. In a preferred example, the system may sort sentences according to their score, where the score will be higher for sentences that appear in many independent sources. The sentence doesn't need to be 'identical', in which case the existence of sub-elements (such as words, term and/or numbers) in the suspected similar sentences can be calculated. Numbers are actually of special importance as they may reflect financial implications of the reported incidents, or the number of persons affected by it. It is expected that these number may be modified or updated from time to time, and thus a fluctuation range can be defined (such as +/−10%) so that even different numbers within the range can still be accounted as mutually collaborative. For example, if one source said:

" . . . . The number of casualties was 4900 persons . . . "
and another source stated:
" . . . . The number of persons killed was 4920 persons . . . "
Then the summary synthesizing engine can state in the summary:
" . . . the number of persons killed was 4900-4920 persons . . . "

Alternatively, it may perform an average on the number reported from several inputs, and/or give more weight for those which contain a more recent date/time attribute, or to source of information that has proven more reliable from previous searches.

Figure 5:
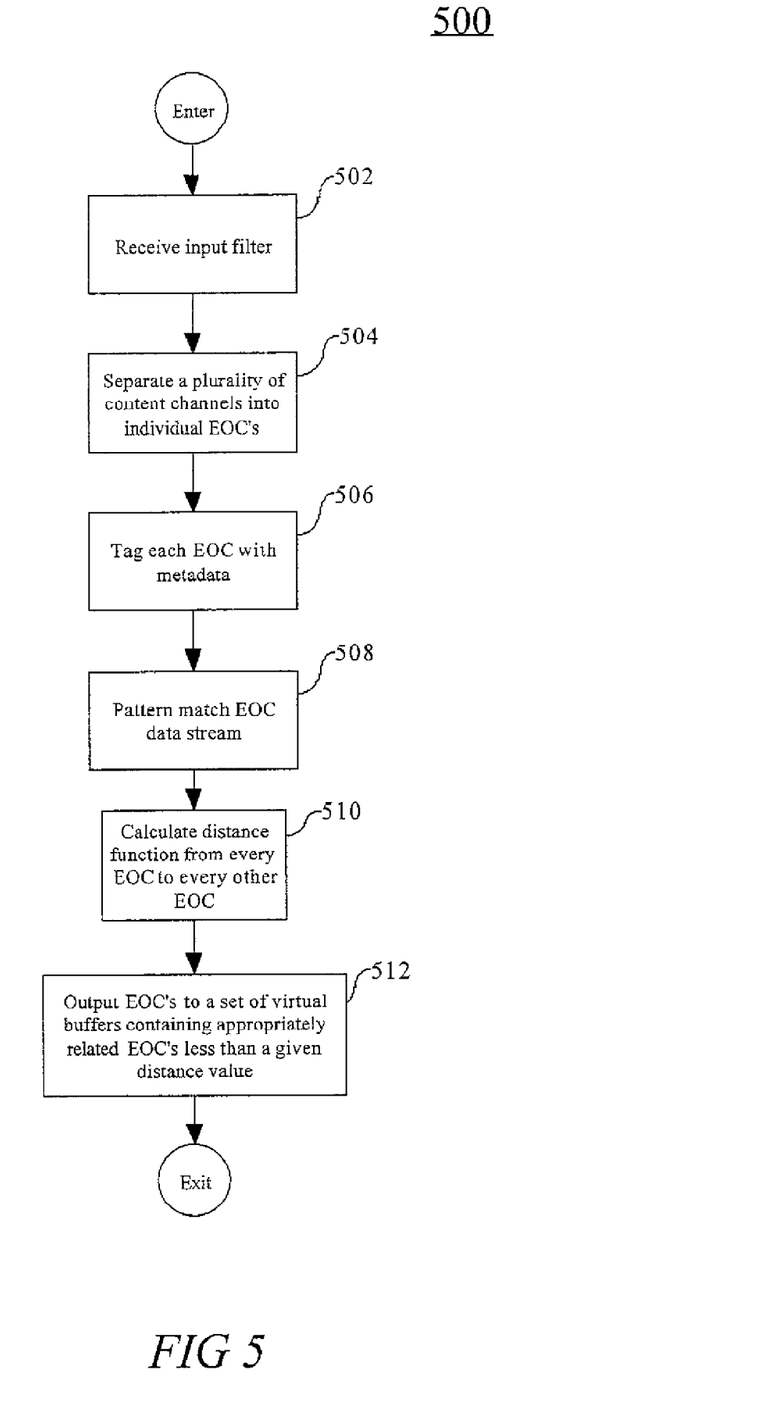
FIGS. 5 and 6 are operational flow diagrams illustrating exemplary operational sequences for the system of FIG. 1, according to a preferred embodiment of the present invention.
Figure 6:
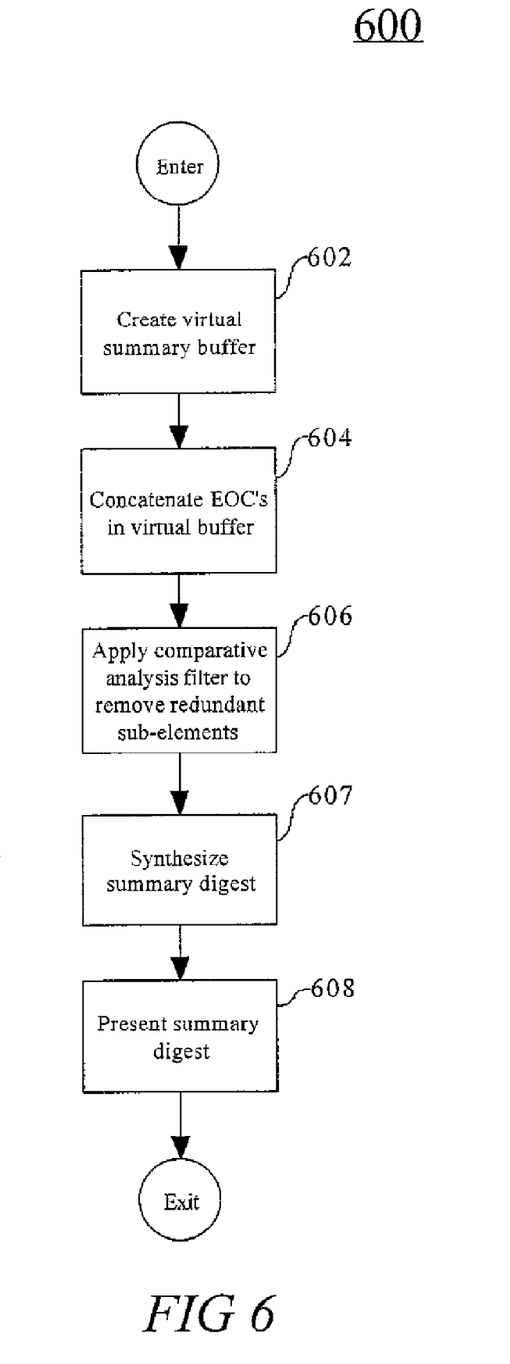
Figure 7:
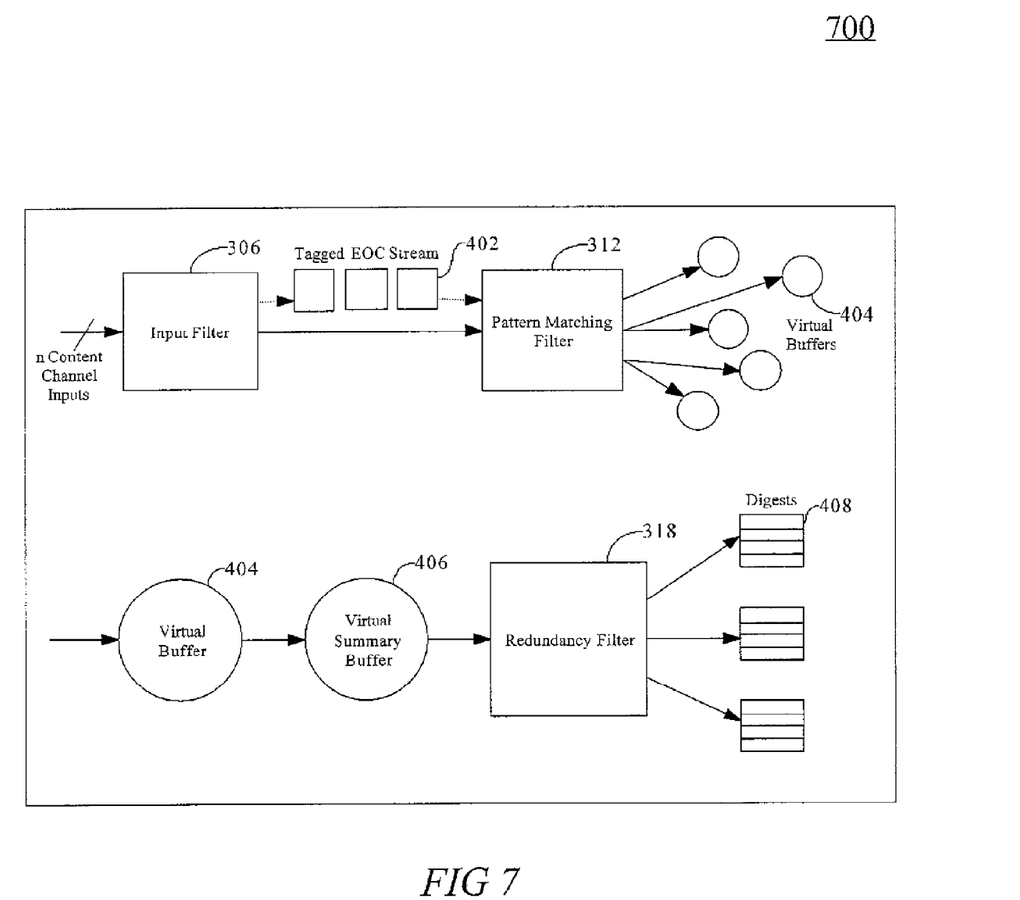
FIG. 7 is a more detailed block diagram showing interoperating components in the system of FIG. 1, according to a preferred embodiment of the present invention.

FIGS. 5 and 6 are operational flow diagrams illustrating exemplary operational sequences for the system of FIG. 1.

The system enters the sequence at step 502, wherein a user is communicating via a user interface 302 with the computer system 102. The user operates the user interface, such as the mouse 208 or keyboard 206 to enter a search query string. Alternatively, the input to the query handler could be provided via a browsing mode of an Internet browser or an agent that pushes relevant summarized information to a user based on a user profile. A query handler 308 invokes the application programming interface 314, at step 504, which uses the search query string as an input filter 306 to separate or segment a plurality of information sources into individual EOC and "tag" each EOC, at step 506, with metadata that indicate source, date, and other relevant information.

Means for segmenting or extracting discrete elements of content from text-based sources are known in the art. Examples include U.S. Pat. No. 6,052,657, "Text segmentation identification of topic using language models", filed Nov. 25, 1997, which describes means for segmenting text and identifying topics contained therein that match a user query, and U.S. Pat. No. 5,806,021, "Automatic segmentation of continuous text using statistical approaches", filed Sep. 4, 1996, which discloses two statistical methods for segmenting continuous text sources, the entire teachings of which collectively are hereby incorporated by reference. The first method simple and rapid but is more error-prone than the second. The second, which uses statistical language models, is more reliable and accurate, but it is also more computationally intensive.

A pattern-matching filter 312, at step 508, performs a pattern matching or similar function on the EOC data stream 402. The pattern-matching concept applies not only to an exact text match, but to a concept match. For example, a query of "International news" will be matched to an item such as "President Bush visited in Paris". In this case, there is a semantic element to the pattern matching filter 312, in that the system must know that Paris is associated with another nation; that a Presidential visit is important, etc.

In a preferred sub-embodiment, a "distance function" is defined so that a distance calculator 310, at step 510, can compute a set of "distances" from each EOC to every other EOC. Then, at step 512, the EOC are provided to a set of virtual buffers 404 where each virtual buffer contains a set of appropriately related EOC. Each of the virtual buffers 404 contains an EOC and every EOC that is less than a certain "distance" from it. Optionally, EOC may be made to "expire" after a particular threshold (e.g., its age) is exceeded. Naturally, a given EOC may be contained in a plurality of virtual buffers.

The grouping of EOC by mutual distance will lead to various data structures, depending on the precise nature of the data. For highly heterogeneous data, the grouping may coalesce into sharply defined and distinct EOC groupings. For less heterogeneous data, however, the boundaries may be fuzzy and it will be non-trivial to define EOC groupings.

Optionally, in step 602, processing to create virtual summary buffers 406 from the virtual buffers 404 may follow. Means for summarization of text-based sources are also known in the art. Examples include:

U.S. Pat. No. 5,918,240, "Automatic method of extracting summarization using feature probabilities", filed Jun. 28, 1995;

U.S. Pat. No. 5,077,668, "Method and apparatus for producing an abstract of a document", filed Sep. 28, 1989;

U.S. Pat. No. 4,358,824, "Office correspondence storage and retrieval system", filed Dec. 28, 1979;

U.S. Pat. No. 5,924,108, "Document summarizer for word processors", filed Mar. 29, 1996; and U.S. Pat. No. 5,689,716, "Automatic method of generating thematic summaries", filed Apr. 14, 1995;

the entire teachings of which collectively are hereby incorporated by reference.

The content of each virtual buffer 404 or virtual summary buffer 406 is passed through a comparative analysis filter 318 which analyzes the "mutually close" EOC, and, based on a set of heuristics, outputs a set of digests 408.

These digests will comprise EOC formats that benefit from such comparative analysis, such as summaries, highly corroborated "findings of fact," trailers (e.g., the most vibrant or exciting details of a set of EOC), and updates (e.g., all related information released within the last 48 hours).

An example of a preferred means for producing a set of summary digests 408 from the virtual buffers 404 or 406 comprises, at step 604, concatenating the EOC included in the virtual buffer 404 or 406, and then, at step 606, applying a comparative analysis filter 318 to remove redundant sub-elements. Sub-elements that are determined to be substantially similar to each other (by knowledge management techniques, e.g., those involving distance functions, known in the art) are used to derive an appropriate degree of corroboration (DOC), which provides an indication of the value of that sentence. The acceptable degree of similarity present in order for two sub-elements to be considered similar is determined by setting a threshold, the value of which is used to fine-tune the process of creating the summary digests. Identical content from apparently different sources is filtered, however, these identical reports are counted and contribute to the EOC DOC value. Another threshold indicating the degree redundancy, which must be present for a representative sub-element to be included in the summary digest (i.e. the maximum distance value) may also be included.

A preferred embodiment, at step 607, then synthesizes summary digests 408 by tracing back to the original EOC, and then extracting the content with a high DOC value in context, i.e. extracting surrounding content so that the synthesized summary is more intelligible. For preferred embodiments involving video or audio input, closed captions (when available), speech recognition technology may be applied to the audio track of the source to produce textual information that may be used to generate DOC measures.

A preferred means for presenting the summary digest 408, at step 608, is to color-code each sub-element of content based on the number of EOC containing that particular sub-element or sub-elements substantially similar to that particular sub-element. For example, a red font might indicate that content substantially similar to that sub-element appeared in greater than 50% of the relevant EOC; a yellow font might indicted the corresponding appearance was between 25% and 50%; a blue font might indicate appearance between 5% and 25%; and a gray font might indicate appearance less than 5%.

Users are able to search on these digests 408 based on their content, the metadata they carry, and their format. The digests 408 are updated on a dynamic basis. In addition to the format of the digest 408, the user may specify an approximate length of the digest. This will factor into thresholding characteristics of the filter 318 that produces the digests 408 from the dynamic content in the virtual buffers 404 or 406.

The digests 408 preferably contain both aggregate and more individualized metadata. For example, the digest as a whole will be assigned a "degree of corroboration" (DOC), which provides a measure of how highly corroborated the content is. Furthermore, users may query with regard to the effective DOC of individual components of the digest, or even be directed to some of the original sources. The metadata structure should be designed to enable such functionality.

In an exemplary embodiment, a database or index may be maintained which reflects the historical DOC data of content available from individual publishers or other information providers or aggregators. These historical data can be used to weight future DOC data appropriately, resulting in improved reliability rankings through a self-learning process. These data are also used to generate valuable lists and rankings of content sources.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A system comprising:
   a memory;
   a data storage adapted to store information and executable programs;
   at least one processor, communicatively coupled to the data storage, the at least one processor adapted to execute the executable programs;
   a digest synthesizing application, communicatively coupled to the data storage and the at least one processor, wherein the digest synthesizing application, in response to receiving a query, is performed to separate a plurality of information sources into individual elements of content (EOC), tag each EOC with metadata, pattern matches each EOC, and calculate a respective distance function from every EOC to every other EOC in order to calculate a respective distance function for each combination of two EOC;
   a result set manager, communicatively coupled to the data storage, the at least one processor and the digest synthesizing application, performed to:
   pre-define each buffer within a plurality of virtual buffers to contain EOC that all have respective distance functions between each other of less than a given distance value, wherein at least one buffer within the plurality of buffers is pre-defined based upon the query;
   provide each of the EOC to a respective associated virtual buffer within the plurality of virtual buffers based upon the respective distance functions between the each of the EOC and EOC previously provided to that respective associated virtual buffer;
   concatenate the EOC in each virtual buffer to create a respective concatenated EOC;
   extract context-preserving EOC from each respective concatenated EOC, the context-preserving EOC being determined based upon a respective degree of corroboration of the context preserving EOC;
   synthesize the content-preserving EOC extracted from each respective concatenated EOC into summary digests; and
   present the summary digests, and wherein the digest synthesizing application further comprises:
   a pattern matching filter performed to pattern match each EOC; and
   a comparative analysis filter, communicatively coupled to the pattern-matching filter, adapted to remove redundant sub-elements from each respective concatenated EOC; and
   a result set, communicatively coupled to the data storage, the at least one processor, and the result set manager, comprising the plurality of virtual buffers.

2. The system of claim 1, wherein the digest synthesizing application comprises:
   a query handler, adapted to receive the query;
   an input filter, communicatively coupled to the query handler, adapted to separate the plurality of information sources into individual elements of content (EOC);
   a distance calculator, communicatively coupled to the input filter, adapted to calculate the respective distance function from every EOC to every other EOC; and
   a pattern-matching filter, communicatively coupled to the distance calculator, adapted to pattern match each EOC.

3. The system of claim 1, further comprising:
   a user interface; and
   a user interface/event manager, communicatively coupled to the user interface and the digest synthesizing application, adapted to receive the user query from the user interface and present the result set to the user interface.

4. The system of claim 1, wherein the result set comprises:
   a set of tagged EOC;
   a set of virtual buffers, communicatively coupled to the set of tagged EOC; and
   a set of summary digests, communicatively coupled to the set of virtual buffers.

5. The system of claim 4, wherein the result set further comprises a set of virtual summary buffers, and wherein the result set manager is further adapted to:

summarize text based EOC contained within each virtual buffer within the set of virtual buffers to create a summarization of each respective virtual buffer; and create a corresponding virtual summary buffer within the set of virtual summary buffers for each of a plurality of virtual buffers within the set of virtual buffers, each corresponding virtual summary buffer containing a summarization of a respective virtual buffer within the set of virtual buffers.

6. A computer readable storage medium tangibly encoded with computer instructions for driving a digest synthesizing application, the computer instructions comprising instructions for:

a digest synthesizing application, communicatively coupled to the data storage and the at least one processor, wherein the digest synthesizing application, in response to receiving a query, is performed to separate a plurality of information sources into individual elements of content (EOC), tag each EOC with metadata, pattern matches each EOC, and calculate a respective distance function from every EOC to every other EOC in order to calculate a respective distance function for each combination of two EOC;

a result set manager, communicatively coupled to the data storage, the at least one processor and the digest synthesizing application, performed to:

pre-define each buffer within a plurality of virtual buffers to contain EOC that all have respective distance functions between each other of less than a given distance value, wherein at least one buffer within the plurality of buffers is pre-defined based upon the query;

provide each of the EOC to a respective associated virtual buffer within the plurality of virtual buffers based upon the respective distance functions between the each of the EOC and EOC previously provided to that respective associated virtual buffer;

concatenate the EOC in each virtual buffer to create a respective concatenated EOC;

extract context-preserving EOC from each respective concatenated EOC, the context-preserving EOC being determined based upon a respective degree of corroboration of the context preserving EOC;

synthesize the content-preserving EOC extracted from each respective concatenated EOC into summary digests; and present the summary digests, and wherein the digest synthesizing application further comprises:

a pattern matching filter performed to pattern match each EOC; and a comparative analysis filter, communicatively coupled to the pattern-matching filter, adapted to remove redundant sub-elements from each respective concatenated EOC; and a result set, communicatively coupled to the data storage, the at least one processor, and the result set manager, comprising the plurality of virtual buffers.

7. The computer readable storage medium of claim 6, the computer instructions further comprising instructions for:

summarizing text based EOC contained within each virtual buffer within the plurality of virtual buffers to create a respective summarization of each respective virtual buffer; and creating a corresponding virtual summary buffer for each of a plurality of virtual buffers within the plurality of virtual buffers, each corresponding virtual summary buffer containing the respective summarization of a respective virtual buffer within the plurality of virtual buffers.

* * * * *